United States Patent [19]

Schmid et al.

[11] Patent Number: 4,761,996
[45] Date of Patent: Aug. 9, 1988

[54] DEVICE FOR TRANSMITTING MEASURING SIGNALS, FOR EXAMPLE, FOR THE TIRE PRESSURE, TO TWIN WHEELS OF MOTOR VEHICLES

[75] Inventors: Hans-Dieter Schmid; Günther Alberter, both of Nuremberg; Gerhard Hettich, Rosstal, all of Fed. Rep. of Germany

[73] Assignee: Robert Bosch GmbH, Stuttgart, Fed. Rep. of Germany

[21] Appl. No.: 90,245

[22] PCT Filed: Sep. 18, 1986

[86] PCT No.: PCT/DE86/00374
§ 371 Date: Aug. 25, 1987
§ 102(e) Date: Aug. 25, 1987

[87] PCT Pub. No.: WO87/03254
PCT Pub. Date: Jun. 4, 1987

[30] Foreign Application Priority Data

Nov. 23, 1985 [DE] Fed. Rep. of Germany ....... 3541529

[51] Int. Cl.$^4$ ............................................. B60C 23/02
[52] U.S. Cl. ...................................... 73/146.5; 340/58
[58] Field of Search ................. 73/146.5, 146.4, 146.3, 73/146.2; 340/58

[56] References Cited

U.S. PATENT DOCUMENTS 4,119,944 10/1978 Smith .................................. 73/146.5

FOREIGN PATENT DOCUMENTS 2549946 5/1977 Fed. Rep. of Germany ..... 73/146.5
0568645 11/1957 Italy .................................... 73/146.5

Primary Examiner—Donald O. Woodiel
Attorney, Agent, or Firm—Michael J. Striker

[57] ABSTRACT

A device for the transmission of measuring signals for the tire pressure of twin wheels of motor vehicles comprises for the purpose of enabling a simple exchange of the individual wheels in the twin wheel at least two signal transmitters which are arranged at each individual wheel in the area of the free outer rim edge in such a way that the first signal transmitter of the first wheel is electrically connected with a sensor of the first wheel and with the signal transmitter of the second wheel, and the signal transmitter of the first wheel is electrically connected with a sensor of the second wheel and with the second signal transmitter of the second wheel by means of coupling devices which are arranged on the rims. A stationary signal receiver is provided in the area of the free outer rim edge of the respective inner individual wheel at a distance from it.

6 Claims, 3 Drawing Sheets

DEVICE FOR TRANSMITTING MEASURING SIGNALS, FOR EXAMPLE, FOR THE TIRE PRESSURE, TO TWIN WHEELS OF MOTOR VEHICLES

BACKGROUND OF THE INVENTION

The invention is related to a device for transmitting measuring signals indicative of tire pressure for motor vehicles.

Such a device is known, for example, from the DE-PS No. 15 05 111. A substantial disadvantage of this known device resides in that it is not possible to interchange the inside and outside individual wheels at a reasonable expense.

SUMMARY OF THE INVENTION

This invention has the object of developing a device of the type mentioned above in such a way as to make possible an interchanging of the internal and external wheels without difficulties.

This object is met by an arrangement of the signal transmitter, which enables an interchanging of the internal and external wheels without in some way interfering with the device according to the invention. Accordingly, an arrangement is obtained, which is important for practice and is considerably simplified, so that faulty operation or damage in connection with the changing or exchanging of tires can be avoided by means of the procedure according to the invention.

It is achieved by means of the arrangement of the first and second transmitters at each individual wheel, that the signals received by the signal receiver have different time intervals so that an identification is made possible by way of the discriminator device by means of determining, when a signal is received, the time that has expired since the preceding signal was received, which identification makes it possible to assign the respective signal to the sensor of the outside or inside wheel.

Other characteristic features, advantages and details of the invention follow from the following description of a preferred embodiment form with the aid of the drawing.

DETAILED DESCRIPTION OF THE PREFERRED EMBODIMENTS

Figure 1:
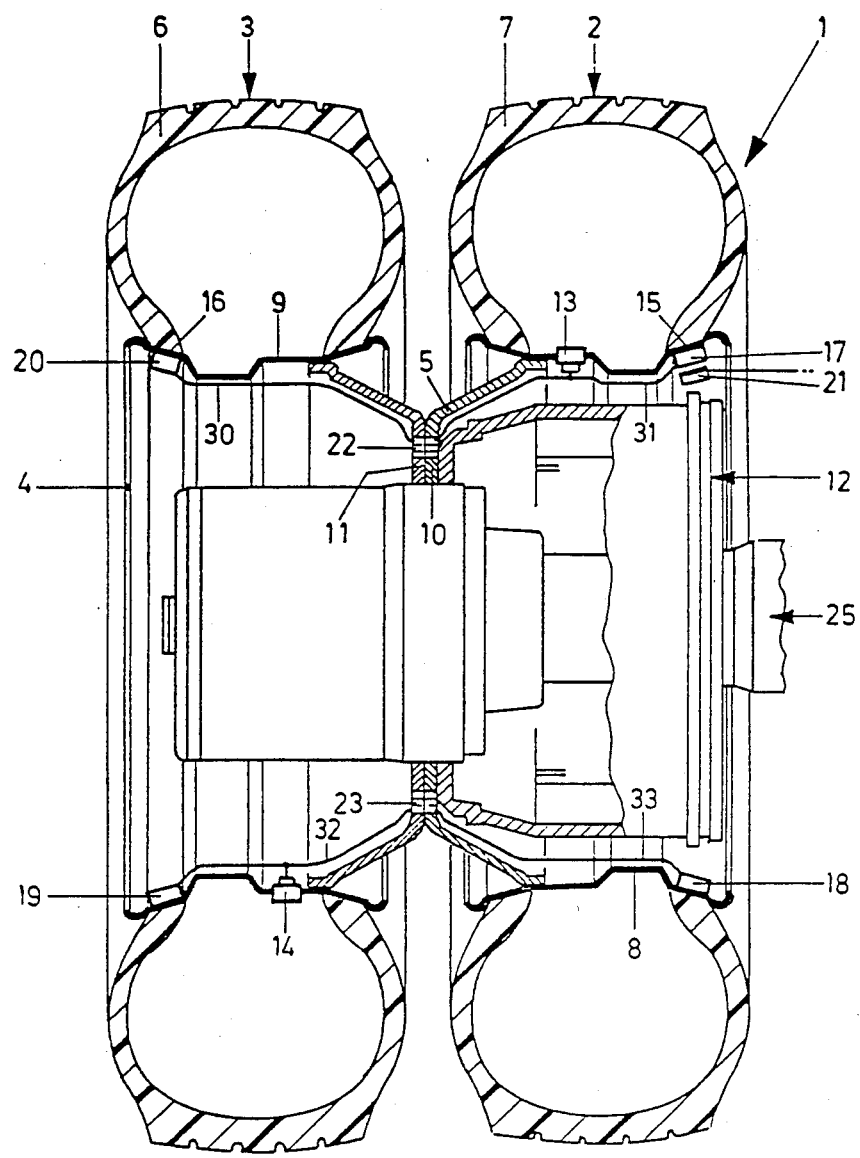
FIG. 1 shows a partial sectional view of a twin wheel which is fastened to a motor vehicle axle.

A twin wheel 1, which comprises two individual wheels 2 and 3, is shown in FIG. 1. Each individual wheel 2 and 3 substantially consists of a rim 4, 5, a tire 6 and 7 which is fitted on the latter.

Each rim 4, 5 comprises an approximately cylindrical pot casing 8, 9 and a rim pot base 10, 11. The rim pot bases 10, 11 of the individual wheels 2, 3, which latter are identical to one another, adjoin one another and are connected in a known manner to a motor vehicle axle 25, together with a hub 12, by means of screws extending therethrough.

A sensor 13, 14 for detecting the air pressure in the tire 6 and 7, which sensor 13 or 14 can be constructed as a threshold value switch which is dependent on the air pressure, is arranged at each rim 4, 5. In addition, two signal transmitters 17, 18 and 19, 20, respectively are arranged in each instance at each rim 4, 5 in the area of its free outer edge 15 and 16. These signal transmitters 17 to 20 accordingly rotate together with the wheels 2, 3. A signal receiver 21, which is arranged in the area of the axle 25 so as to be stationary, is assigned to the signal transmitters 17 to 20. Coupling devices 22 and 23 are arranged in the area of the rim pot bases 10 and 11.

Figure 2:
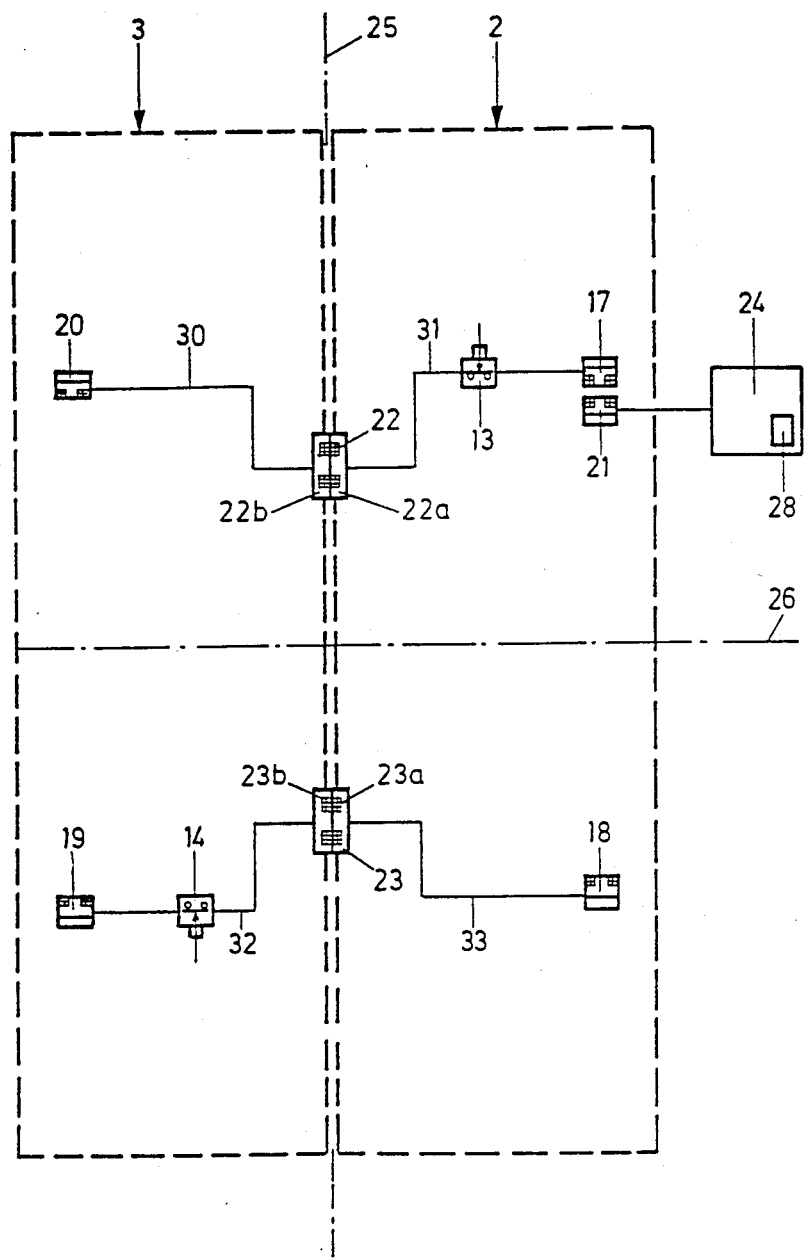
FIG. 2 shows a schematic presentation of the geometric positions of the individual structural component parts of the device according to the invention.
Figure 3:
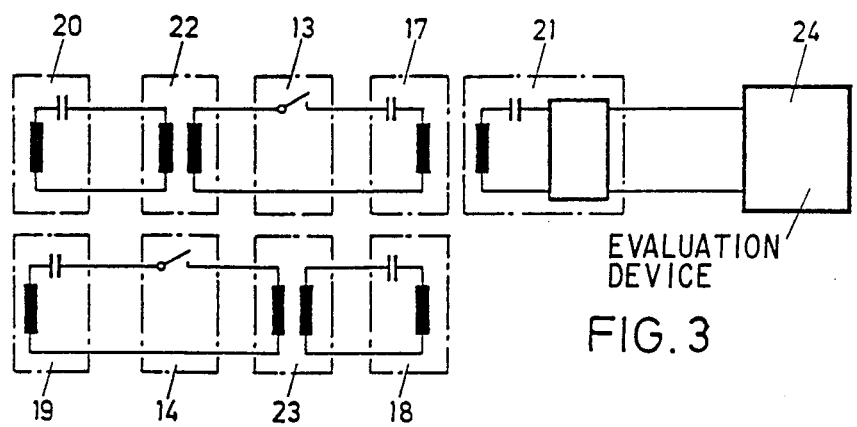
FIG. 3 shows a basic wiring diagram of the device according to the invention.

As is particularly clear from FIGS. 2 and 3, the signal transmitter 20 is connected with the sensor 13 and the signal transmitter 17 via a coaxial wire or cable 30, the coupling device 22 and a coaxial wire or lead 31, while the signal transmitter 19 is connected with the sensor 14 and, via a coaxial cable 32, the coupling device 23 and a coaxial wire or cable 33, with the signal transmitter 18. Accordingly, the signal receiver 21 alternately receives signals of the sensor 13 and the sensor 14 and, accordingly, also alternately receives signals corresponding to the air pressure conditions in the wheel 2 or 3, an evaluating device 24 being arranged subsequent to the signal receiver 21. As follows from FIG. 3, the signal transmitters 17 to 20 work by means of an oscillating circuit connection which is known per se (compare, e.g., DE-OS No. 30 37 722).

Because of the geometric arrangement which is obtained according to the invention, it is possible to interchange the wheels 2, 3 easily in such a way that each of the two wheels can run on the outside or the inside.

Figure 4A:
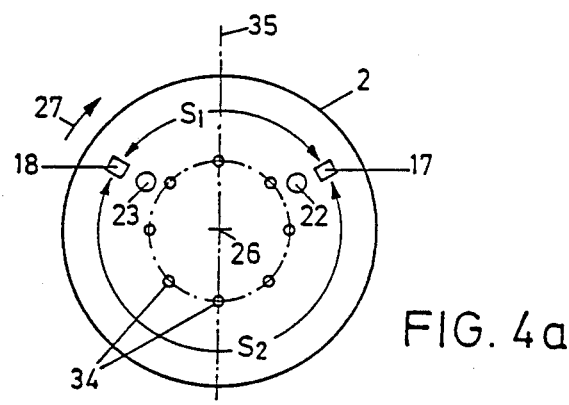
FIGS. 4a and b schematically show the signals for illustrating the signal discrimination between the sensors of the two individual wheels.
Figure 4B:
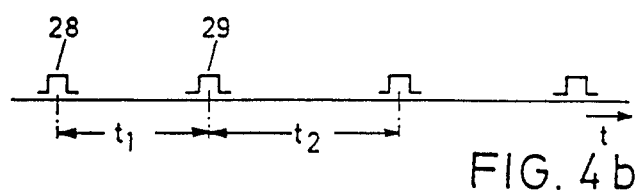

As follows from FIG. 4 there is provided for the purpose of enabling a separate monitoring of the two wheels 2 and 3 that the signal transmitters 17, 20 and 18, 19 are arranged relative to the axis of rotation 26 in such a way that they are not located exactly opposite one another, i.e. that the angular spacing $S_1$ and $S_2$ is different. This is illustrated in FIG. 4a by way of the example of wheel 2, wherein the angular spacing $S_1$ between the signal transmitter 18 and 17, as seen in the direction of rotation (arrow 27), is smaller than the angular spacing $S_2$ between the signal transmitter 17 and 18. As a result, the signal receiver 21, as shown in FIG. 4b, receives signals 28 and 29 at different time intervals $t_1$ and $t_2$, so that with the aid of a discriminator device 28a in the evaluating device 24, the possibility exists of determining on the basis of the time interval between a signal 28 or 29, which was just evaluated, and the respective preceding signal, whether this signal was transmitted by the signal transmitter 17 or 18 and whether it is to be assigned, accordingly, to the sensor 13 or the sensor 14 and, accordingly, to the wheel 2 or the wheel 3. The signal sequence is reversed on the opposite side of the vehicle.

As is shown schematically in FIG. 2, the coupling devices 22 and 23 consist, in each instance, of high-frequency transformers, two magnet cores 22a, 23a and 22b, 23b of the latter, with high-frequency coils inserted therein, being fastened at each rim 4, 5 at an angular distance from one another, the magnet cores 22a, 23a and 22b, 23b being open on one side. The arrangement of the magnet cores 22a, 22b, 23a, 23b is such that their open front sides are located opposite one another when the twin wheels are mounted. In order to acheive a transmission of high-frequency oscillation at the coupling devices 22, 23 which is as free as possible of losses, it is advisable to construct the magnet cores 22a, 22b, 23a, 23b in a pot-shaped manner as pot-core transformers and to fasten them in corresponding boreholes in the pot bases 10, 11 of the rims 4, 5 so that their open front sides adjoin one another in the assembled state of the twin wheels. However, should such an arrangement not be possible for reasons of space, particularly when using a plurality of fastening screws, the coupling devices can also be fastened to the rim edges, which face one another, or to the edge areas of the rim pot bases 10, 11 in such a way that they be located opposite one another in the mounted state. Since the shortest possible coaxial cables are desired with high-frequency signals of 1 MHz, it is advisable that the coupling devices 22, 23—as shown in FIG. 4a—have an angular spacing diverging from 180°, in the same way as the signal transmitters 17, 18 and 19, 20 of each wheel 2, 3. In order to ensure a desired interchanging of the individual wheels 2, 3 in this case, as well, the fastening holes 34 of the rim 4, 5 must also be arranged so as to be symmetrical to the coupling devices 22, 23. For the purpose of illustration, an axis of symmetry 35 is shown in FIG. 4a between the two coupling devices 22 and 23, the fastening holes 34 and the coupling devices 22, 23 being arranged symmetrically relative to it.

It will be understood that each of the elements described above, or two or more together, may also find a useful application in other types of devices for transmitting measuring signals differing from the types described above.

While the invention has been illustrated and described as embodied in a device for transmitting measuring signals for the tire pressures, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

We claim:

1. Device for the transmission of measuring signals of tire pressures in twin wheels of motor vehicles, which twin wheels are each formed of two individual wheels having rim pot bases adjoined one another, the device comprising at least two sensors (13, 14) each provided on an outer rim of each individual wheel of a twin wheel; at least two signal transmitters (17, 18 and 19, 20) arranged on each individual wheel (2, 3) in a region of an outer rim edge (15, 16) thereof; coupling devices each provided on a rim of each individual wheel and connecting said signal transmitters to said sensors in such a way that a first signal transmitter (17) of a first wheel (2) of the twin wheel is electrically connected with a sensor (13) of the first wheel (2) and with a signal transmitter (20) of a second wheel (3), and a signal transmitter (18) of the first wheel (2) is electrically connected with a sensor (14) of the second wheel (3); and a stationary signal receiver (21) positioned in the region of the outer rim edge (15 or 16) of one of individual wheels (2) at a distance from it.

2. Device according to claim 1, wherein the signal transmitters (17, 18 or 19, 20) of each wheel (2, 3) are arranged so as to be angularly offset relative to an axis of rotation (26) of the wheel in such a way that said signal transmitters have an angular spacing diverging from 180°.

3. Device according to claim 1, wherein the coupling devices (22, 23) each include high-frequency transformers with two magnet cores (22a, 23a and 22b, 23b) open at one side thereof and having high-frequency coils, the magnet cores being fastened at each rim at an angular distance from each other in such a way that open front sides of the magnet cores are located opposite one another when the twin wheels are assembled.

4. Device according to claim 3, wherein the signal transmitters (17, 20 and 18, 19), sensors (13 and 14) and coupling devices 22 and 23) are connected with one another in each instance by means of a coaxial cable (30, 31 and 32, 33).

5. Device according to claim 3, wherein each rim has a base (10, 11), the magnet cores (22a, 22b, 23a, 23b) being fastened to the base (10, 11) of each rim (4, 5).

6. Device according to claim 1, wherein the coupling devices (22, 23) have an angular spacing diverging from 180°, and fastening holes (34) are provided in each rim (4, 5), said fastening holes being arranged symmetrically with respect to the coupling devices (22, 23) for a possible interchanging of the individual wheels.

* * * * *